US005189510A

United States Patent [19]

Henaff et al.

[11] Patent Number: 5,189,510
[45] Date of Patent: Feb. 23, 1993

[54] METHOD AND DEVICE FOR THE ACQUISTION AND DIGITAL STORAGE OF COLORED GEOGRAPHICAL MAPS AND DISPLAY OF THE MAPS

[75] Inventors: Yves Henaff, Viroflay; Hervé Le Roux, Louviers, both of France

[73] Assignee: Matra Sep Imagerie et Informatique, France

[21] Appl. No.: 491,691

[22] Filed: Mar. 13, 1990

[30] Foreign Application Priority Data

Mar. 13, 1989 [FR] France .................. 89 03240

[51] Int. Cl.$^5$ .................. H04N 1/46; H04N 1/00
[52] U.S. Cl. .................. 358/75; 358/78; 358/401; 358/403
[58] Field of Search .......... 358/75, 78, 401, 403, 358/443, 448, 450, 453, 462, 474, 479

[56] References Cited

U.S. PATENT DOCUMENTS

| 4,301,469 | 11/1991 | Modeen et al. | 358/75 |
| 4,485,409 | 11/1984 | Schumacher | 358/479 |
| 4,673,988 | 6/1987 | Jansson et al. | 358/479 |
| 4,685,068 | 8/1987 | Greco, II et al. | 358/75 |
| 4,984,279 | 1/1991 | Kidney et al. | 358/450 |

OTHER PUBLICATIONS

Proceedings of the Sid, vol. 14, No. 1973, Los Angeles US, pp. 18-25; P. J. Min: "Computer-aided mapping technology for geographic data base".
Proceedings of SPIE, Applications of Artificial Intelligence VI, Orlando, Fla., US, Apr.-4-6, 1988, vol. 937, 1988, SPIE, Washington, US pp. 402-410; R. L. Sandford et al.: "The application of knowledge base and digital image analysis techniques to automated map interpretation R. O. Duda et al.: Pattern classification and scene analysis " pp. 10-43, chapter 2, 1973, J. Wiley & Sons, New-York, U.S.

Primary Examiner—Edward L. Coles, Sr.
Assistant Examiner—Thomas D. Lee
Attorney, Agent, or Firm—Larson and Taylor

[57] ABSTRACT

A process is provided for acquiring and digitally storing colored geographical maps having black portions. Each of a plurality of mutually adjacent maps is digitized by raster scanning so as to represent each map as a separate matrix of first pixels each encoded as a word having a predetermined number of bits and representing at least three fundamental colors of a respective one of said first pixels. The first pixels of each of said maps are classified by assigning each of them to one of a predetermined number of classes depending on their color. A mosaic is formed of mutually connected maps by re-sampling the mutually adjacent maps as second pixels and assigning, to each said second pixel, the code of that first pixel which is closest thereto. The mosaic is split into mutually identical blocks and a color file is formed for each block. A black-and-white file is formed for each block by storing, for each line in the block, black segments consisting of second pixels having a radiometric value lower than a predetermined threshold each in the form of the indication of the first pixel of the black segment.

12 Claims, 3 Drawing Sheets

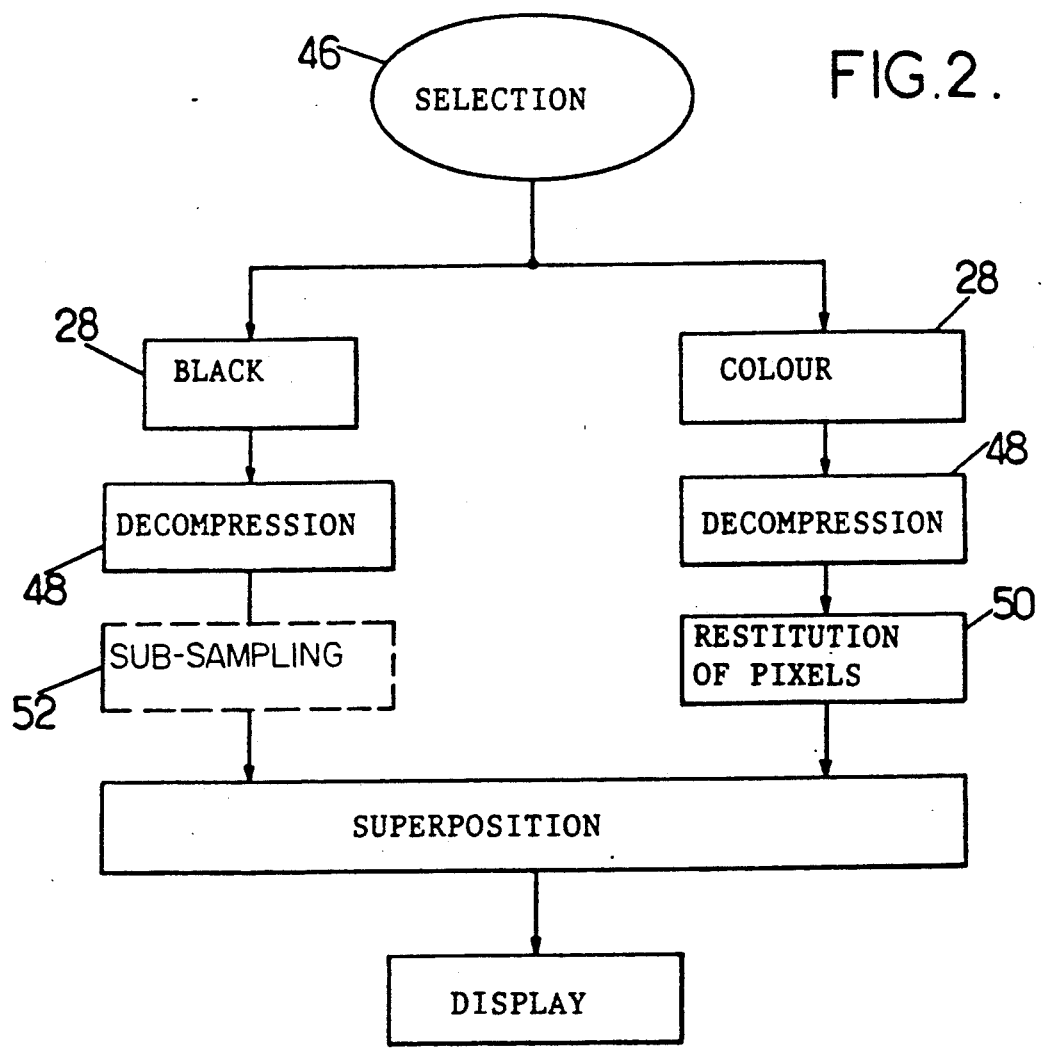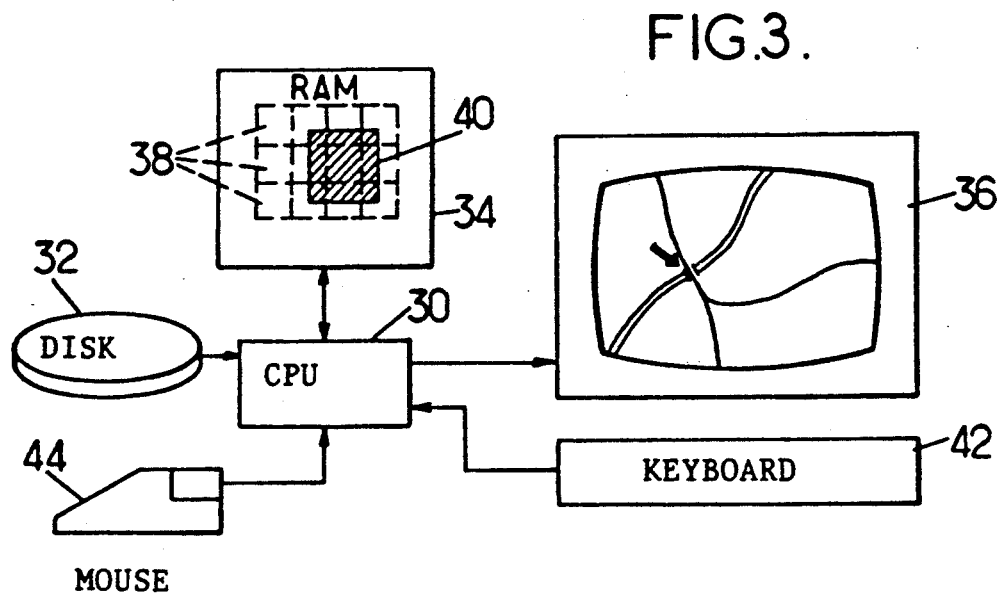

METHOD AND DEVICE FOR THE ACQUISTION AND DIGITAL STORAGE OF COLORED GEOGRAPHICAL MAPS AND DISPLAY OF THE MAPS

BACKGROUND OF THE INVENTION

1. Technical Field

The invention relates to the acquisition and digital storage of coloured geographical maps and retrieval thereof.

2. Prior Art

Conventional geographical maps on paper are ill-suited to numerous needs which are increasing at the present time, for example the preparation of long distance missions: each manuscript map can only represent a very limited area, all the more reduced when the map is on a larger scale. The discontinuities represented by the frontiers between maps hinder the preparation of an overall plan.

In theory, nothing opposes acquisition and digital storage of geographical maps on paper: it is sufficient to capture and digitize images as pixels with a scanner. Such a storage is faced with the problem of the volume of data of be stored and, in addition, it does not solve the problem of passing from one map to an adjacent map.

Numerous processors for automatically converting maps into computer-storable form have already been suggested. Reference may for instance be made to the paper by P. J. Min "Computer-aided mapping technology for geographic data base", Proceedings of the S.I.D., Vol. 14, No. 1, 973, pp. 18-25, which describes a vectorial approach for converting map manuscripts into a form which is computer-readable and makes it possible to creating hard copy map outputs. Another approach, which involves a full analysis for feature extraction and consequently requires a very complex system, is disclosed in the paper by R. L. Stanford et al "The application of knowledge base and digital image analysis techniques to automated map interpretation", Proceedings of SPIE, Applications of Artificial Intelligence VI, Orlando, Fla., Apr. 4-6, 1988, Vol. 937, pp. 402-410, SPIE, 1988, Washington U.S.

The prior art methods have one or more of the following shortcomings: they require a complex computing device; the volume of data to be stored for a proper recovery of a colour map is very high; there is no easy possibility to display portions of the map with more than one predetermined definition.

SUMMARY OF THE INVENTION

It is an object of the invention to provide a method of acquisition and digital storage of geographical maps which very considerably reduces the volume of data and improves flexibility in use. It is another object to store it under a form which avoids discontinuities comparable to those met with when passing from one paper map to another when displaying portions of two adjacent maps on a same display unit. It is still another object to render it possible to display a portion of a map with a resolution which may be selected between two values, as regards the most significant features.

For that purpose, the invention uses the fact that the resolution required for the coloured pixels (the number of colours used in a map being generally small and not exceeding 8) is much lower than that which is desirable for black indications (level lines, alpha-numeric indications, references, . . . ) and that degradation of the colours is not very troublesome.

The invention consequently provides a method in which:

(a) each of a plurality of mutually adjacent maps is digitized by raster scanning for representing it by a matrix of pixels encoded for representing at least three fundamental colours of each pixel;

(b) the pixels of each of said maps are classified by assigning them to a predetermined number of classes depending on their colour, whereby each of said pixels is defined by a code having a number of bits less than that for step (a);

(c) a mosaic of mutually connected maps is formed by re-sampling said maps, in a common reference grid, typically by assigning to each re-sampled pixel the code of the closest pixel obtained by operation (b);

(d) the mosaic is split up into mutually identical blocks, each having a predetermined number of pixels;

(e) a colour file is formed for each pixel by (e1) compressing the pixels into macropixels each consisting of n mutually adjacent pixels (for example n=4 pixels disposed in a square array) and assigning each macropixel to a single class representative code, then (e2) storing, in each line of macropixels, each segment having constant colour segment in the form of the code of the class of the first macropixel of the segment and the number of macropixels of the segment; and (f) a black and white file is formed for each block by storing, for each line in the block, each black segment in the form of the indication of the first black pixel and the number of pixels of the segment.

BRIEF DESCRIPTION OF THE DRAWINGS

The invention will be better understood from the following description of a particular embodiment, given by way of example. The description refers to the accompanying drawings, in which:

FIG. 2, complementary to FIG. 1, is a logic diagram of the retrieval process for display with a minimum resolution;

FIG. 3 is a simplified diagram showing hardware components for retrieval and display on the screen.

DETAILED DESCRIPTION OF A PREFERRED EMBODIMENT

Figure 1:
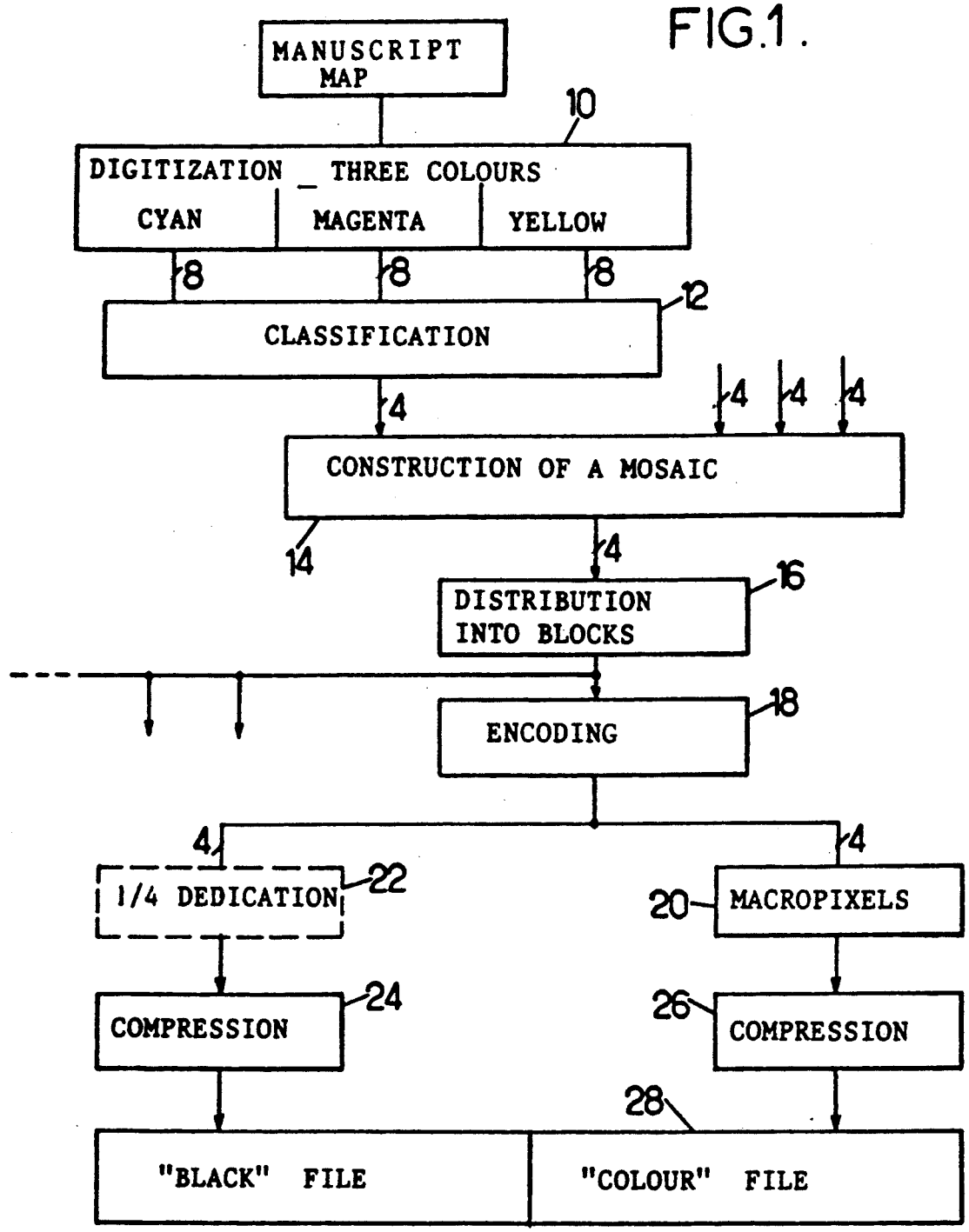
FIG. 1 is a simplified logic diagram of the acquisition storage method.

A method according to the invention comprises several steps, some of which are known, and for this reason will not be described in detail.

1. In the case of acquisition from a paper map, the first step (designated by 10 in FIG. 1) consists in digitization so as to generate, from a coloured map, at least three files corresponding to the three base colours. A scanner may in particular be used which, in three passes, provides three files obtained by raster scan, formed of evenly distributed pixels distributed in parallel lines. A spacing between lines and between the pixels of the same line of 0.1 mm will generally be satisfactory for later display. The three basic colours will generally be those used for television, namely cyan, magenta and yellow. It is possible to provide an additional scan for forming a file distinguishing the pixels having a reflectivity or brightness less than a predetermined threshold, considered as "black", from all others. This is however unnecessary, since the "black" pixels may be identified and included in a specific class during the encoding step, through software processing, as will be seen later.

At the end of this step, each of the maps to be stored is available in the form of three files in which a number is assigned to each pixel. The number may be a 8-bit binary number representing a radiometric value (reflectivity for example) for the colour considered.

2. A first encoding consists in a classification (12 in FIG. 1) which reduces the volume of data to be stored. The classification may be made in two phases, first of all a "signature computation", then an encoding step properly speaking which makes use of a maximum likelihood classification algorithm.

Computation of the signatures is made by determining optimum class frontiers. It begins by computing a three-dimensional histogram of the three basic colours, over the whole map. The frontiers between classes may then be determined by segmentation of the histogram to define classes best suited to the nature of the original individual maps (which depends on the nature of the ground represented and the mode of representation).

The histogram may typically be divided into segments by the migrating means algorithm, which is an iterative algorithm for causing the class frontiers to adjust progressively in response to the distribution of the pixels.

Such segmentation may be carried out by a software process, with existing programs. Examples of such programs, which are commercially available, include Pace, available from PCI, Inc., Richmond Hill, Ontario, Canada and which is described for instance in "Pace multispectral analysis manual, 1988" and "Pace geometric correction manual", 1988 published by PCI, Inc.

The number of classes is generally defined a priori. It is desirable not to exceed sixteen classes, so as to be able to define each pixel by a number of four bits. For relatively homogeneous maps, eight or ten classes may be sufficient.

It is desirable to check that the selected classes provide a satisfactory visual impression upon display. Interactive learning may be provided. It may consist in selecting a reference image portion, or "picturette", for example of 512×512 pixels, selected in a representative map. The portion is chosen so as to contain examples of all graphic data and all colours. The reference portion is encoded, stored and displayed on a CRT and the operator compares it with the original picture. He may then modify the signatures for removing defects, for example formed by dedications which give a subjective impression which is judged unsatisfactory. Signature modification may be made by adjusting the mean value.

Encoding properly speaking uses distribution of the pixels among the classes (some pixels do not correspond to any class, or on the contrary, are included in several classes so that an assignment selection should be made). A maximum likelihood classification may be used of the kind described for example in Duda and Hart, "Pattern classification and scene analysis", Wiley & Sons, 1979, Ch. II. Different clustering methods can be used; for example the class limits are defined by a predetermined deviation for each of the base colours with respect to a mean value for each class (parallelepipede classification).

Classes may be used corresponding to:

| | |
|---|---|
| white | red |
| light grey | green |
| dark grey | blue |
| black | yellow |
| .... | | with a particular code, from 0 to 15 for instance, assigned to each class.

The above step is sufficient when the individual maps to be assembled together are homogeneous, i.e. have comparable reflectivity contrasts and have colours whose shade hardly varies from one map to the other. This favorable situation is met with when the maps belong to the same manufacturing batch.

In other cases, it is not possible to obtain satisfactory results with a small number of classes. It may then be necessary, even for maps having only few colours, to make a distribution among a higher number of classes.

The classes are defined by the operator: first, he monitors, possibly off-line, all the individual maps to be assembled into a mosaic and determines by trial and error what number of classes (and which class signatures give best results on the selected reference portions).

3. Assembling individual maps into a map "mosaic" renders it possible to solve the problem associated with overlapping of mutually adjacent maps and also with the fact that the individual maps are sampled regularly over their own surface, and not in a projection common to all the individual maps to be assembled together.

Assembling into a mosaic 14 consists in resampling the individual maps in a common geographical projection, which may be that of one of the maps. It involves:

acquiring the characteristic points from each of the elementary maps coded by classification, these characteristic points being possibly those of a goemetric grid;

computing the coordinates of such characteristic points in a mosaic map resulting from the assembly of the individual maps and deriving therefrom deformation operators, using for example a polynomial regression process of low degree (always less than 6); such step may be implemented using the above-identified programs;

re-sampling each of the individual maps so as to have, in each map, pixels which are evenly distributed in the common projection.

Re-sampling may be very simple; it may use the algorithm of the closest neighbouring pixel, which consists in assigning each pixel of the common projection to the class of the closest pixel in the original individual map (or in one of the individual maps if there is overlapping).

The amount of deformation undergone during such assembling is always sufficiently small for the size of the pixel not to be significantly modified.

4. For easier display during retrieval, it is convenient to fractionate the mosaic map into "blocks" each corresponding to a fraction only of an individual map and only occupying a fraction of a standard display screen such as a colour TV tube. Cutting up (as indicated at 16) into blocks of 512×512 pixels generally gives satisfactory results.

5. For making it possible to obtain a resolution for the linear features and alphanumeric inscriptions overprinted on the map which is better than for coloured areas, where a lower resolution is acceptable, encoding 18 differs from prior art approaches.

Each block is represented by an intermediate "black" file with a resolution corresponding to the size of one pixel (0.1 mm for example) and an intermediate "colour" file with reduced resolution, corresponding to the size of a "macropixel" consisting of several pixels, typically four.

In the "black" file, one bit is sufficient for identifying the radiometric or reflectivity value of the pixel (black or not black, i.e. white); by assigning each coloured macropixel to a class, four bits are sufficient for each macropixel, which corresponds to one bit per pixel.

For a number of applications, it is of advantage to have a stored representation which makes it possible to select between two display modes of a map portion:

a low scale display for which a large area comparable to that of a full individual paper map, may simultaneously be observed on a screen, for instance with each macropixel having a size of about 200 μm (as compared with 250–300 μm per pixel in most present day display modes);

a high scale representation, with a high resolution of the alpha-numeric characters and symbols, for better readibility thereof.

(a) In some cases, a complete display with a reduced resolution may be accepted, corresponding to the size of a macropixel of 0.2×0.2 mm; the matrix of "black" pixels may be fractionated into squares having an individual size equal to that of one macropixel; in the file, one of the pixels of each square is assigned to a class defined, not by its real value, but by a value calculated from the four pixels (at 22 in FIG. 1).

In the "colour" file 20, each macropixel is computed from the four corresponding pixels by an operator using a colour priority table. This table may be defined, for each particular case, by an operator, always on the basis of the same general rule, namely that priority is given to the most significant colour, namely the color carrying most data. Frequently, the following priorities, in decreasing order, will be used.

colour used for alpha-numeric characters and overprinting, colour assigned to the elements of small area or linear elements, other colours, by order of importance.

In a map in which the level curves are black, the following decreasing priority order for the colours may be adopted:

colour assigned to inscriptions or symbols,
colour assigned to the road network,
colour assigned to the hydrographic network,
colour assigned to the forests,
background colours.

This step makes it possible to obtain much more satisfactory retrieval than sub-sampling of one colour pixel out of n (n being an integer greater than 1).

(b) An alternative approach will now be given, assuming that the black pixels are not identified during step 1 and "black" is considered as a colour, with the radiometric values for cyan, magenta and yellow lower than specific thresholds. For easier computation the codes p(a) attributed to the colours will be all the more greater as the colour has a greater priority. For instance

| a | p |
|---|---|
| black (text) | 8 |
| dark blue (hydrography) | 7 |
| red (roads) | 6 |
| orange red (level lines) | 5 |
| light blue (water sheets) | 4 |
| green (vegetation) | 3 |
| grey (shades) | 2 |
| white (background) | 1 |

More generally, processing can be as follows if b is the code value for black and is attributed to the background colour (i.e. white);

All sets of four pixels having respective code values $a_1, a_2, a_3, a_4$ are processed for generating a "black" file and a "colour" file.

In the "black" file, each pixel has a value $b_i$ which may be zero (not black) or one (black). Operation is:

assuming that b (8 in the above table) is the code value for black:

$$\begin{vmatrix} i = 1, 4 \\ b_i = 0 \\ \text{except if } a_1 = b; \text{ then, } b_i = 1. \end{vmatrix}$$

The "colour" file stores macropixels each having a value $a_0$; assuming that w designates the lowest priority code value (white in the above table) then the stored value $a_0$ results from a processing sequence as follows:

$$p = 0$$

$$a_0 = w$$

$$\begin{vmatrix} i = 1, 4 \\ \text{if } [p(a_i) > p \text{ AND } a_i = b] \\ \text{then} \begin{cases} a_0 = a_i \\ p = p(a_i) \end{cases} \end{vmatrix}$$

A modification which renders later decompression faster consists in further deciding:

$$b_1 = 1 \text{ if } (a_2 = b) \text{ OR } (a_3 = b) \text{ OR } (a_4 = b)$$

Figure 1A:
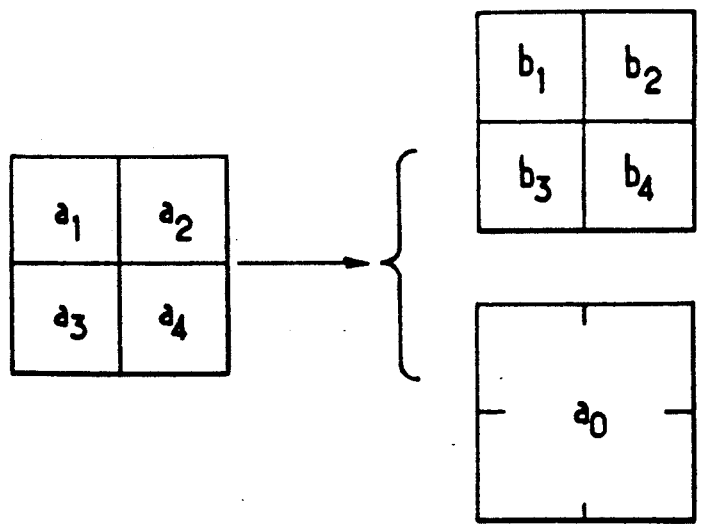
FIG. 1A indicates how each pixel is represented in two files following compression.

For each set of four pixels, there will be four bits $b_1$, $b_2$, $b_3$, $b_4$ in the "black" file and one multibit number in the "colour" file (FIG. 1A).

6. Final compression uses the fact that, along a scanning line, a same colour may exist over a considerable distance.

Each black file may in particular be compressed by coding the lengths of black and white segments along the scanning direction during digitization, by identifying the first pixel and the number of pixels in the segment before reverting to the black (or out of black).

In practice, this final compression reduces the storage volume to 0.38 bit/pixel in the "black" file for typical maps.

The colour file for each block may be similarly compressed at 26 (FIG. 1), by storing the digit indicating the class of each pixel at the beginning of each uniform colour segment, and the number of pixels in the segment.

Because the coloured zones are more numerous and have a larger area than the black zones, in a typical case, the file can be stored in a form which requires 0.25 bit/pixel, namely 1 bit/macropixel. The complete storage corresponds then to 0.63 bit/pixel.

For each block two files 28 are obtained which may be stored in an addressable bulk memory (hard disk for example) containing all the files of the mosaic.

The method may be implemented on a production line whose input member is a conventional scanner. The scanner may be separate from the rest of the line which then receives the files representing the paper maps in three fundamental colours stored on bulk data carriers. The line may be used not only for acquisition but also for retrieval and display by adding an electronic processing board specific to the retrieval functions.

Real time retrieval takes place by a procedure which is reverse of the preceding one. It will first be described with reference to FIGS. 2 and 2A in a case where it takes place with a high resolution of 0.1 mm/pixel, in a line having a general construction as shown in FIG. 3.

The line of FIG. 3 comprises a central computing unit 30 (CPU) having a hard disk unit 32 forming a high capacity memory for storing files 28. The CPU is provided with a display RAM 34 having a storage capacity sufficient to contain at least the number of blocks (of 512×512 pixels for instance) required for forming the image on a display screen 36. Referring to FIG. 3, RAM 34 may have a capacity of nine blocks 38; that part 40 of the display memory corresponding to the zone to be visualized is indicated by hatching.

The CPU 30 has input peripherals comprising a keyboard 42 and a mouse 44 for designating for example that point to be located in the middle of the screen, by modifying the contents of the screen memory under the control of the computing unit 30 which, if required, transfers new blocks from the disk unit 32 to the RAM 34. In other words, the display RAM 34 is permanently up-dated in response to commands indicating a zone in the mosaic map introduced by an operator.

In addition to block selection, the CPU 30 processes the data read from the disk unit 32 before writing them into the display RAM 34, so that they can be directly used by the display memory. Selection (at 46 in FIG. 2) is by the operator. The respective blocks are addressed in the disk unit 32 and the two files of each block are processed in parallel.

For each file, decompression (at 48 in FIG. 2) restitutes the black pixels and the colour macropixels. The black blocks are decompressed and brought to the television type scanning (raster scan) format before they are written into the display memory 34. The colour blocks are processed in the same way but, in addition, the macropixels are over-sampled at 50 by duplication, for making available pixels of the same size as the black pixels. Finally, the black pixels are inserted in the corresponding colour blocks. Decompression is made by a specific retrieval electronic board included in the line and which only comes into play during retrieval.

Figure 2B:
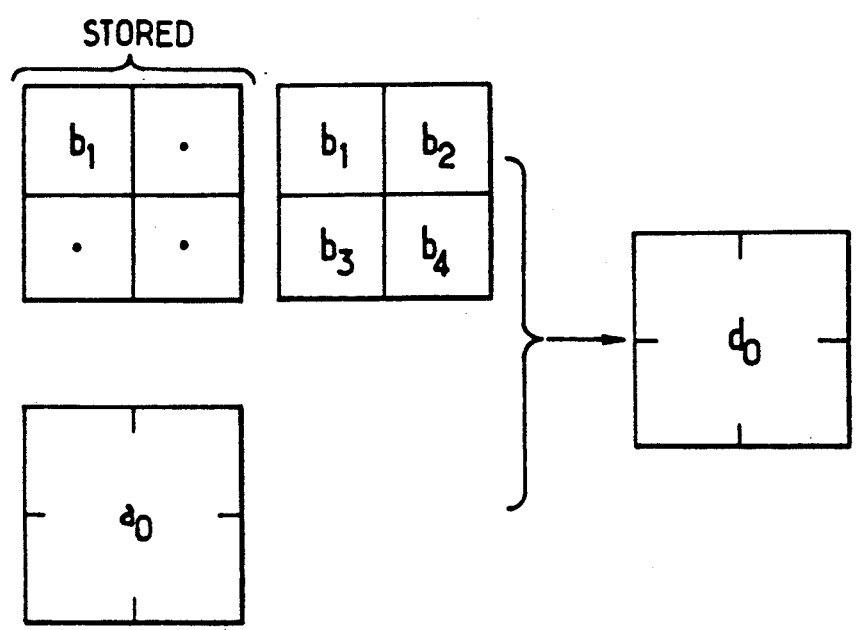
FIGS. 2A and 2B are representations of decompresion sequences.
Figure 2A:
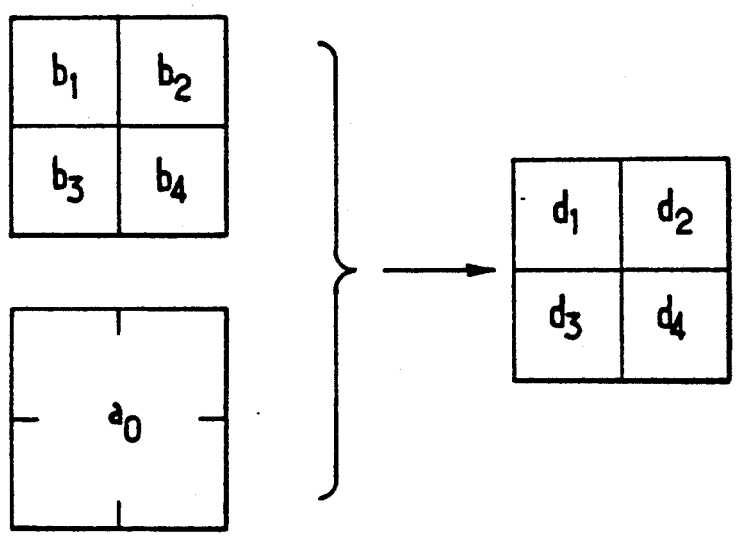

The pixel recovery process in that case is schematized in FIG. 2A. The four colour pixels in a set are obtained by the processing loop:

$$i = 1, 4$$

$$\begin{vmatrix} d_i = a_0 \\ \text{if } b_i = 1, \text{ then } d_i = b. \end{vmatrix}$$

When a definition corresponding to the size of a macropixel is sufficient (for instance for a small scale display), step 50 is omitted; on the other hand an additional step 52 for processing the "black" file is provided: only those pixels in the "black" file are retained which were computed from radiometric values of a set of four pixels.

In other words, there is sub-sampling (one column out of two and one line out of two). The value of the pixel retained is assigned to a complete macropixel. If the approach schematized in FIG. 1A was used for compression, then the processing sequence for a set of four pixels represented by $a_0$ (from 1 to 8 for instance) in the colour file,
$b_1, b_2, b_3, b_4$ in the black file,
may be as follows (FIG. 2B).

A macropixel $d_0$ is reconstructed by a process which results from the rule that the macropixel $b_0$ is black if one at least of the pixels $b_i$ in the set is black:

$$d_0 = a_0$$

$$\begin{vmatrix} i = (1, 4) \\ \text{if } (b_i = 1), \text{ then } d_0 = b \end{vmatrix}$$

If the modified compression mode was used, then the sequence is faster:

$$d_0 = a_0$$

if ($b_1 = 1$), then $d_0 = b$.

The reconstructed block is in all cases transferred to its proper position in the display memory.

The computing unit 30, the hard disk unit 32, the control keyboard 42 and the display screen 36 of the system can be used not only for aquisition but also for retrieval; an additional I.C. board specific to retrieval is simply added. The algorithms for preparing the black pixels for retrieval thereof with a definition equal to that of a macropixel may be made by software implemented without difficulty in any language.

The reduction of data volume to be stored is apparent when a typical example is considered, formed by the acquisition of maps originating from the French National Geographic Institute at scale 1/50000, with a definition of 0.1 mm/pixel. Conventional digitization in three basic colours requires storing $20 \cdot 10^6$ pixels. Coding by classification makes it possible to reach a compression rate of 6. With two files, one black and the other coloured, the compression rate may be doubled without significant loss of visibility. Finally, with a compression by segments, an overall compression rate of about 38 may be obtained: a whole map may be stored with $1.6 \cdot 10^6$ bytes, instead of $60 \cdot 10^6$ in the case of direct digitization.

We claim:

1. A process for acquiring and digitally storing coloured geographical maps having black portions, comprising the steps of:

a) digitizing each of a plurality of mutually adjacent maps by raster scanning for representing each of said mutually adjacent maps as a separate matrix of first pixels each encoded as a word having a predetermined number of bits and representing at least three fundamental colours of a respective one of said first pixels;

b) classifying the first pixels of each of said maps by assigning each of them to one of a predetermined number of classes depending on their colour, whereby each of said pixels is defined by a class defining code having a number of bits less than the respective word obtained in step (a);

c) forming a mosaic of mutually connected maps by re-sampling said mutually adjacent maps as second pixels, in a common reference grid and assigning, to each said second pixel, the code of that first pixel which is closest thereto;

d) splitting up the mosaic into mutually identical blocks, each having a same predetermined number of second pixels;

e) forming a colour file for each block by (e1) compressing groups of the second pixels into respective macropixels each consisting of n mutually adjacent second pixels, n being a predetermined integer, and assigning, to each said macropixel, a single of said class defining codes, then (e2) storing, for each line of macropixels, each line segment consisting of macropixels having a same constant colour, as a combination of the code of the class of the first macropixel of the segment and of the number of macropixels in the segment; and f) forming a black-and-white file for each block by storing, for each line in the block, black segments consisting of second pixels having a radiometric value lower than a predetermined threshold each in the form of the indication of the first pixel of the black segment and the number of following pixels also having a radiometric value lower than said threshold.

2. Process according to claim 1, wherein, during step (e), each of said macropixels is generated starting from the values of four pixels distributed in a square array.

3. Process according to claim 2, further comprising, during step (f), a preliminary operation of substituting a predetermined pixel in each macropixel with a value obtained from the four second pixels used for generating the macropixel, in the black and white file.

4. Process according to claim 3, wherein said predetermined pixel is given a black value if anyone of the four pixels in the macropixel is black.

5. Process according to claim 4, further comprising the operation dual of steps (e) and (f), decimating the black and white file by selecting only said predetermined pixels, displaying said macropixels and incrustating said predetermined pixels, when black, each in substitution of one coloured macropixel.

6. Process according to claim 1, wherein, during step (b), each of said classes is determined by the algorithm of the migrating means on a three-dimensional histogram of the distribution of the colours in a map or a set of maps.

7. Process according to claim 6 for coding maps having eight colours or less, wherein the number of classes is selected at a value not exceeding 16.

8. Process according to claim 1, further comprising:

(g) displaying a map zone on a screen from said colour file and said black and white file by carrying out an expansion consisting of an operation which is dual of (e) and (f) whereby coloured pixels are obtained by oversampling of said micropixels, displaying the pixels of the oversampled colour file and incrustating the black pixels.

9. A process according to claim 1, wherein n=4, the mutually adjacent pixels are in a square arrangement and the code assigned during step (e1) is the code of that pixel which has a predetermined position in the square arrangement.

10. A process according to claim 1, wherein step (a) further comprises an additional scan for determining those first pixels which have a reflectivity less than said predetermined threshold and wherein the second pixels corresponding to such first pixels are considered as black during step (f).

11. A process according to claim 1, wherein, during step (f), a second pixel is considered as black if radiometric values of the respective second pixel for each of said three fundamental colours are lower than specific predetermined thresholds.

12. Device for acquisition and digital storing of geographical maps, comprising:

means for raster scanning a plurality of mutually adjacent maps and digitizing them for representing each map as a matrix of first pixels each coded by at least three digital numbers each representing a fundamental colour;

means for classifying the first pixels by distributing them between a predetermined number of classes each defined by a signature, according to a maximum likelyhood criterium, each class being defined by a respective code having a number of bits lower than that of the digital numbers for encoding the individual first pixels;

means for generating a mosaic of mutually connected maps by resampling said first pixels in a common reference grid for obtaining second pixels each designated by one said code;

means for fractionating said mosaic into mutually adjacent blocks of same size each having a predetermined number of pixels distributed in lines in a matrix arrangement;

means for generating a colour file of each block by grouping said pixels into macropixels each consisting of n mutually adjacent pixels and dedicating a single class representation code to each said macropixel; then storing, for each line of macropixels, each segment as the code of the class and the indication of the first macropixel in the segment and the number of macropixels of the segment;

means for generating a black and white file of each block by storing, in each line, each segment consisting of successive ones of said second pixels which have a radiometric value lower than a predetermined threshold as an indication of the first black second pixel in the segment and the number of pixels in the segment; and means for writing said files in a mass memory having means for addressing said blocks.

* * * * *